Figure 1:
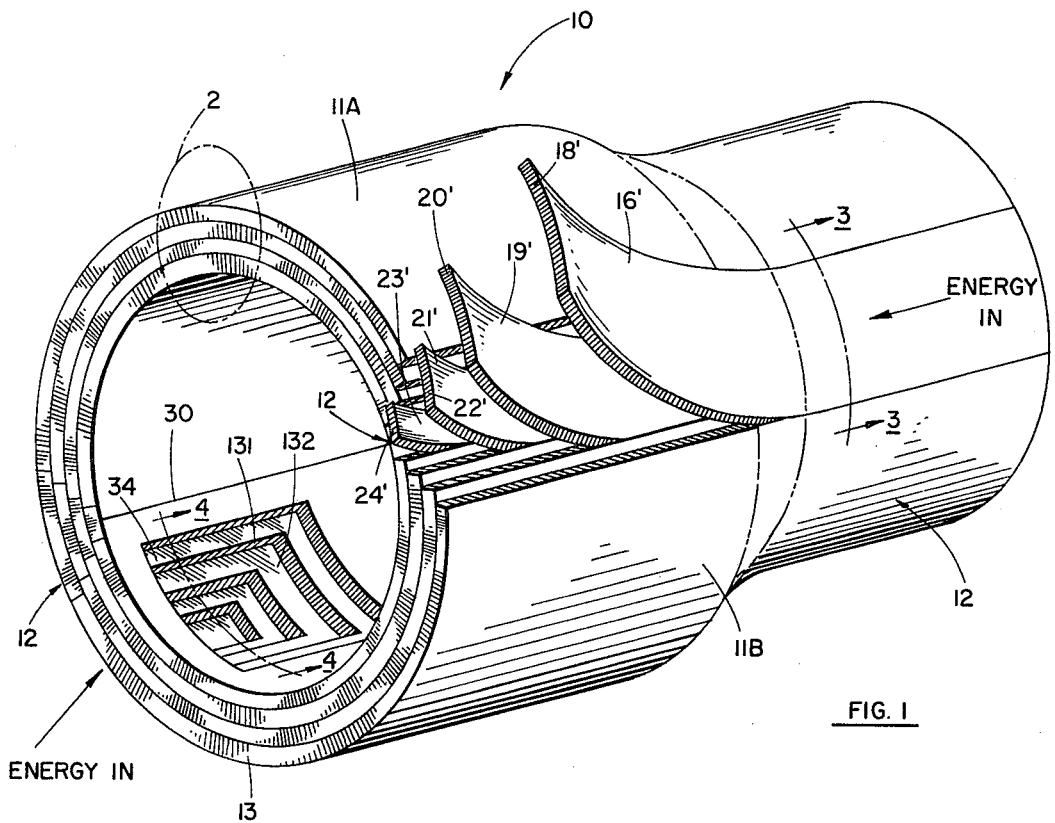

United States Patent [19]
Costanza

[11] 3,806,928
[45] Apr. 23, 1974

[54] LAMINATED SANDWICH CONSTRUCTION

[75] Inventor: Leonard J. Costanza, Los Angeles, Calif.

[73] Assignee: North American Rockwell Corporation, El Segundo, Calif.

[22] Filed: Mar. 16, 1964

[21] Appl. No.: 353,019

[52] U.S. Cl. .................. 343/18 A, 156/98, 156/297, 156/304, 343/872
[51] Int. Cl. .......................................... H01q 17/00
[58] Field of Search .......... 343/18 A, 872; 156/304, 156/98, 297, 303.1; 161/88, 38

[56] References Cited
OTHER PUBLICATIONS
Oleesky, "Modern Plastics," February, 1952, pp. 99–100, 102, 104–106. TP986.A2M6.

*Primary Examiner*—Maynard R. Wilbur
*Assistant Examiner*—Richard E. Berger
*Attorney, Agent, or Firm*—; ; Richard D. Seibel

EXEMPLARY CLAIM
1. A structural joint for a laminar composite radar attenuating structure comprising:
   first and second sections of laminar composite structure in edge abutment and having successive attenuating layers of preselected electrical characteristics collectively providing the composite structure with a substantial attenuation of electromagnetic radiation impinging thereon, said successive attenuating layers terminating at progressively increasing distances from the edge abutment to form a substantially V-shape stairstep partial gap between said first and second sections;
   a connecting section between said first and second sections comprising strips of material bridging the edge abutment so that junctions between layers of said strips of bridging material and corresponding successive attenuating layers of said first and second sections are mutually displaced to minimize magnitude of variations in attenuation of electromagnetic radiation, and wherein each of said strips is composed of substantially similar material as the corresponding successive layers of said first and second sections; and
   a curable adhesive resin for bonding said strips to said successive layers.

11 Claims, 4 Drawing Figures

3,806,928

SHEET 1 OF 3

INVENTOR.
LEONARD J. CONSTANZA
BY Richard D. Seibel
ATTORNEY

LAMINATED SANDWICH CONSTRUCTION

This invention relates to laminated sandwich fabrication and repair. More particularly it relates to fabrication of a radar attenuating structure.

It has been customary in the fabrication of honeycomb sandwich structures to build the entire object in a single piece so that joints are staggered throughout the material or to construct smaller portions of an overall structure incorporating structural fasteners for assembly. It is difficult in fabricating very large structures to employ a single piece technique as the processing equipment required becomes unduly large and expensive. Difficulty is also encountered in the fabrication of large structures where the assembly is made by interconnecting sections of honeycomb sandwich by means of structural fasteners or adhesive bonding. In either of these latter techniques stress concentrations occur and inherently weak portions of the structure are involved.

Laminated honeycomb sandwich structures are employed for attenuating electromagnetic energy such as radar. These laminated structures are assembled out of carefully selected materials so that a preselected gradient of electrical characteristics is obtained through the laminated sandwich. The gradient is selected so as to minimize the reflectance of radar from the surface so constructed. Structures of this type are described in a copending application entitled "Multi-Layer Structure and Fabrication Method" by Leonard J. Costanza, Claude J. Kennedy and Geza G. Liskay, Ser. No. 340,564, filed Jan. 27, 1964, and assigned to North American Aviation, Inc., the assignee of this application. It has been found that interconnections made by conventional fastening techniques yield discontinuities in the electrical characteristics of the radar attenuating material. These electrical discontinuities result in an increased reflection of radar energy from the surface.

It is therefore a broad object of this invention to provide an improved interconnection for laminated honeycomb structures.

It is another broad object of this invention to provide an improved radar attenuating structure.

Thus in the practice of this invention according to a preferred embodiment, there is provided a joint interconnecting two sections of multicore laminated honeycomb material. The two sections of honeycomb material are formed so as to have opposed stairstep arrangements adjoining a joint line wherein the risers on the stairsteps are honeycomb core and the treads on the stairsteps are sheet laminating material. The opposed stairsteps are progressively increasingly remote from the joint line, that is, each successive step is set back from the joint line a greater distance than the next previous step. Sections of honeycomb core are interposed between the corresponding risers on the two laminated honeycomb sections and sections of sheet laminating material are positioned so as to bridge the inserted honeycomb core and overlap the sheet laminating material on the treads of the stairsteps. The inserted sections of laminating sheet are bonded to the treads on the stairsteps and to the inserted honeycomb core by an adhesive resin. A regular progression of increasing sizes of honeycomb core inserts and laminating sheet materials is placed into the joint structure so that part of the interconnection between the laminated honeycomb sandwich sections is displaced away from the joint line at which the honeycomb sandwich sections abut. Such a distribution of interconnections yield a strong and reliable joint without appreciable increase in structure thickness or weight.

In a radar attenuating material the laminating sheet materials include a material having preselected electrical properties, preferably a preselected insertion loss. Radar impinging on a composite so constructed is attenuated due to a gradient in the insertion loss values for successive laminating sheets. A discontinuity in the electrical properties of one of the sheets causes a slight diminution of the attenuation of radar. If variations in the electrical properties of all of the sheets of a composite structure are superimposed a substantial decrease in the attenuation is observed. The joint structure provided according to the practice of this invention eliminates superposition of the electrical discontinuities so that segments of radar attenuating material can be joined without introducing highly reflective regions.

When radar energy impinges on a surface the principal reflection is closely approximated by conventional ray optics. Thus it is generally only the radiation reflected normal to the surface that is of significance in terms of detection of a vehicle by a single radar station. It has been found, however, that within the cavity of a jet engine air intake, for example, some of the reflection at angles different from the normal to the surface may be of significance in producing a substantial radar echo. In the multiple core laminated material illustrated and described herein the principal reflection of concern is near the normal to the surface and energy entering at an appreciable angle to the normal will be effectively attenuated by the described structure. It has been found that a structure constructed of multiple laminations of resistive material as described will attenuate energy entering near a normal to the surface. If a joint between adjacent sections of laminated structure has a discontinuity running therethrough substantially normal to the surface an appreciable radar reflectance is obtained from the joint structure. The joint structure described herein eliminates any discontinuity extending normal to the surface of the composite which extends more than a small portion of the way through the composite. Any incident radar energy entering the surface near the normal encounters not more than one abrupt change of the electrical properties and the attenuation observed is substantially the same as if no joint at all were present.

In addition it has been found that a joint constructed as illustrated herein provides a lighter weight part than is obtained by assembling contiguous sections of honeycomb with conventional fasteners. Likewise it is found that the joint structure, which is, after bonding, substantially integral with the sections of honeycomb laminate, is substantially stronger than conventional joints. Some joints have been made in the past wherein cements are employed at the joint line and fitted sections of honeycomb are closely abutted to provide a single joint running normal to the surface. Such a joint not only contributes an appreciable radar reflectance to the structure but also has an appreciably lower strength than the joint herein described. Difficulty is also encountered with such a joint because of the variable quantity of cement required to form the joint thereby contributing an unpredictable weight to the part. Additionally it is often found that raised portions of the surface occur at such a joint which interfere with the aerodynamic characteristics of a vehicle.

Thus it is a broad object of this invention to provide an improved honeycomb structure.

It is another object of this invention to provide a means for interconnecting honeycomb sandwich sections.

It is another object of this invention to provide a method of forming large laminated honeycomb structures.

It is a further object of this invention to provide an improved radar attenuating material.

It is another object of this invention to provide a structural joint having low radar reflectance.

It is a further object to provide a method for repairing laminated materials.

Figure 3:
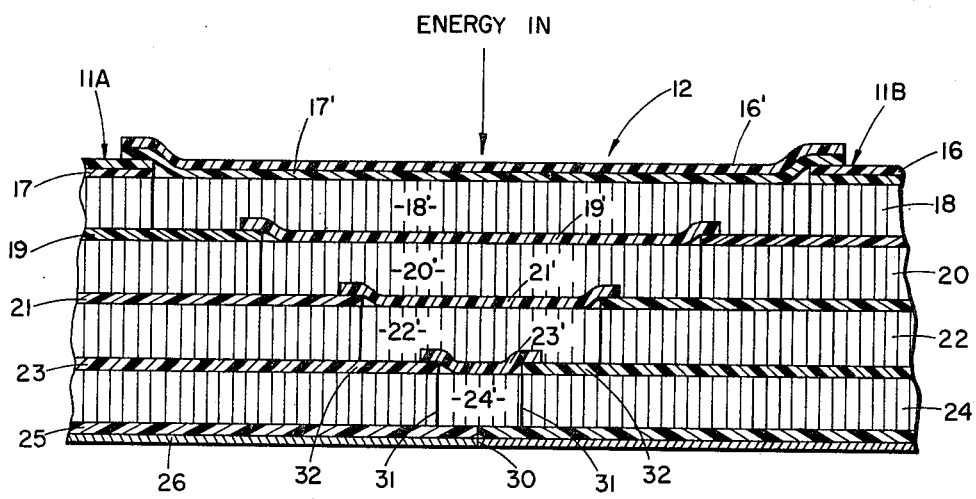
Figure 2:
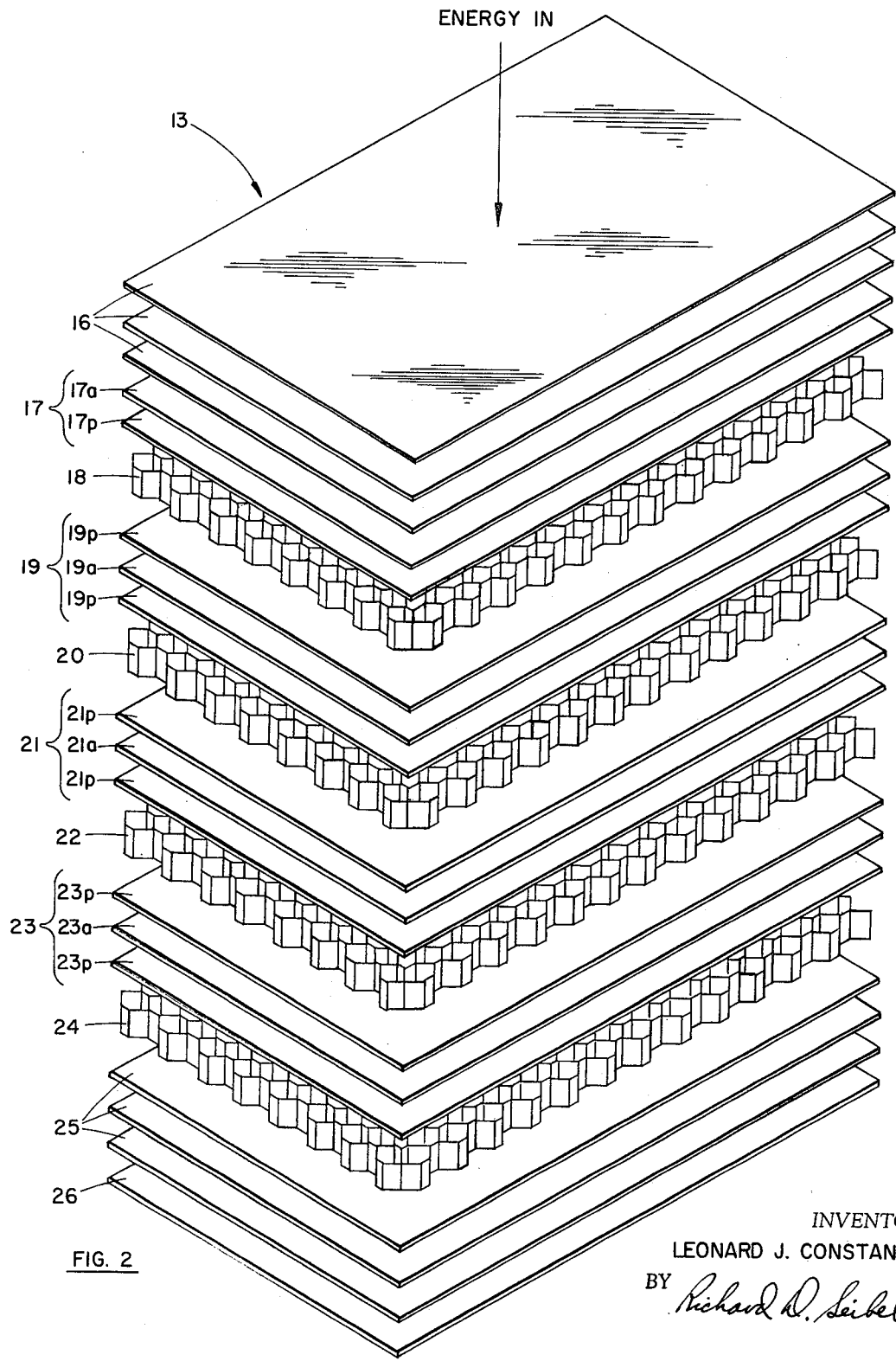
Figure 4:
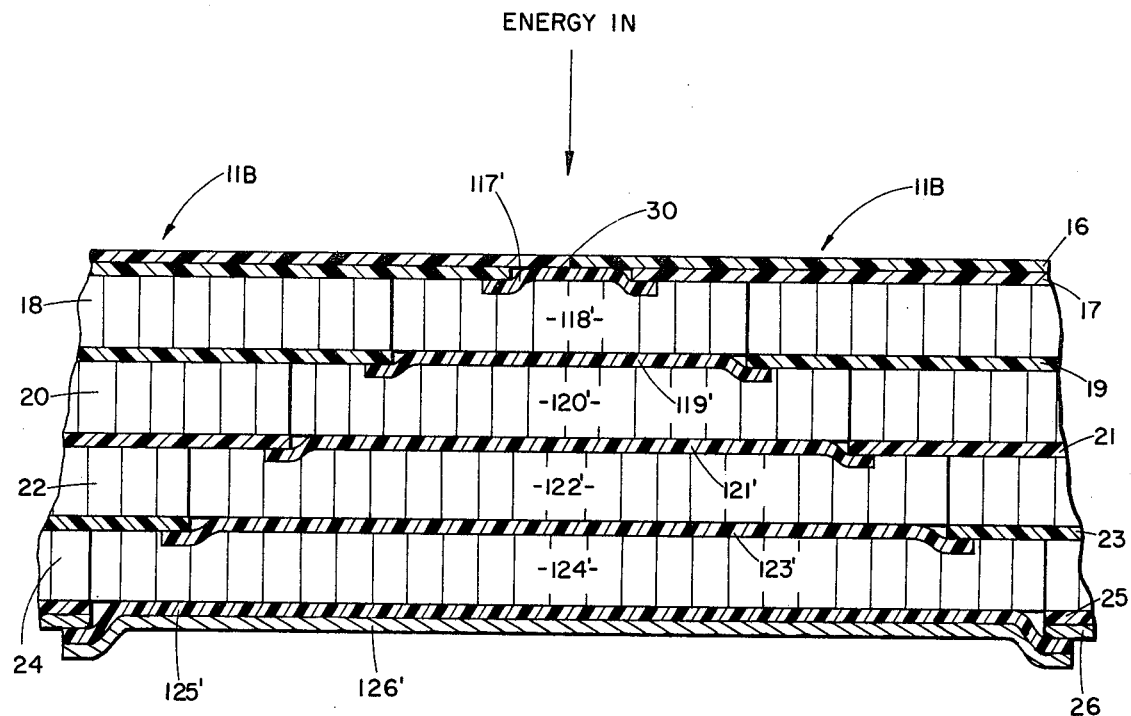

Other objects and many of the attendant advantages of this invention will be readily appreciated as the same becomes better understood by reference to the following detailed description when considered in connection with the accompanying drawings wherein:

FIG. 1 illustrates an aircraft part constructed according to the principles of this invention and having parts peeled back to show the laminated arrangement;

FIG. 2 comprises an exploded view of a laminated honeycomb structure particularly adapted for attenuating radar energy;

FIG. 3 illustrates a cross section of a joint fabricated according to the principles of this invention, and FIG. 4 comprises a cross section view of a repair section in a honeycomb laminate.

Throughout the drawings like numerals refer to like parts.

FIG. 1 illustrates a portion of a jet engine air intake diffuser 10 constructed of laminated honeycomb sandwich incorporating the principles of this invention. As illustrated in this embodiment the intake diffuser 10 is fabricated in two substantially identical sections 11A and 11B. These two sections are joined to form the complete diffuser by a joint structure 12 embodying the principles of this invention. The diffuser 10 illustrated is a part which is positioned on the axis of the jet engine air intake so that the outer surface of the diffuser is exposed to the flow of air and to incident radar energy. The inner surface of the diffuser when assembled with other engine parts forms a closed cavity for containing operating devices for the jet engine. In the preferred embodiment the diffuser is constructed of a radar attenuating honeycomb laminate 13 which is further illustrated in FIG. 2.

The laminated sandwich illustrated in FIG. 2 is exploded so as to better illustrate the individual components of the honeycomb laminated sandwich. The upper portion of the exploded assembly illustrated is the portion upon which incident radar energy would impinge and forms the outer surface of the jet intake diffuser 10. Broadly the illustrated structure of the laminated sandwich 13 comprises a plurality of fabric laminating sheets and a number of layers of honeycomb material bonded together to form a composite structural material. The assembly forming a preferred embodiment of laminated sandwich is more fully described in the aforementioned copending application.

In a preferred embodiment the first three sheets 16 of material upon which the radar impinges are glass fabric impregnated with an epoxy resin and suitable activators. This fabric is typically about 0.004 inch thick and has a plain weave with a thread count of from 60 to 80. A typical epoxy resin for use in this material is one having a viscosity of from 10,000 to 16,000 cps. and an epoxide equivalent of approximately 180 to 195 such as is commercially available as Epon 828 from the Shell Chemical Company. Typical activators for the epoxy resin are diamino diphenyl sulfone in an amount of about 20 parts per 100 parts of resin and boron trifluoromonoethylamine in an amount of about one part per 100 parts of resin. This fabric is impregnated with the resin system and a solvent and the preimpregnated material completely dried so that the uncured fabric sheets are relatively dry to the touch and are only slightly tacky. Such resin impregnated fabrics are known as prepregs. In the illustrated embodiment it is desirable that after curing, the epoxy resin impregnated glass fabric be sufficiently strong to give a structurally strong composite when supported by the underlying materials and that this layer be sufficiently rigid to prevent deformation under aerodynamic flow conditions. It should also have sufficient temperature resistance to withstand aerodynamic heating and sufficient hardness to resist erosion from rain and small particles of solid material.

The fourth sheet 17a from the outside surface of the structural composite is a radar attenuator sheet comprising a glass fabric coated with an elastomer such as neoprene containing a suspension of conductive carbon such as graphite, acetylene black or furnace black. In order to obtain an attenuation of radar energy it is preferred that a layer of resistive or partly conductive material be placed at a preselected distance from the inner surface of the composite. It is preferred that the first attenuator sheet 17a have an impedance not greatly dissimilar from the impedance of free space. The electrical properties of this attenuator sheet and others employed in the fabrication of the assembly are controlled as more fully described in the aforementioned copending application to obtain optimum performance of the composite material. The fifth sheet 17p of material from the outside surface of the structural composite is a glass fabric prepreg substantially similar to the epoxy resin impregnated prepregs 16. The sub-assembly of attenuator sheet 17a and prepreg 17p is referred to herein as a laminating sheet sandwich 17 or attenuator layer 17. Similar nomenclature is used for other similar attenuator layers.

Inwardly from the outer sub-assembly of fabric sheets is a layer of honeycomb core material 18. The honeycomb core employed in the practice of this invention is arranged to have the axes of the cells oriented normal to the surface of the sheets, for spacing the laminating sheet layers apart as illustrated in FIG. 2. The cell geometry of the honeycomb material can be rectangles, hexagons or other geometry. In a preferred embodiment the honeycomb material is a glass fabric impregnated with a nylon modified phenol-formaldehyde resin which has been coated with an epoxy resin containing conductive carbon. A typical honeycomb material for use in the illustrative embodiment has a hexagonal cell cross-section with a maximum cell dimension of about one-fourth inch and a total thickness of about 0.23 inch. After coating the honeycomb core material with a thin layer of epoxy resin having conductive carbon therein the dielectric constant of the material is approximately 1.25 when viewed at radar frequencies along a direction parallel to the axes of the individual cells. The dielectric constant is adjusted in this way to optimize radar attenuation of the completed composite. The epoxy resin is preferably similar to that employed in the prepreg sheets. The epoxy resin renders the honeycomb core pliable before curing due to interaction with the phenol-formaldehyde resin. Instead of honeycomb core, the low density dielectric layer can comprise foamed plastic or corrugated material having appropriate electrical properties.

Inwardly of the first honeycomb layer of the illustrative embodiment is a laminating sheet sandwich 19 comprising two prepreg sheets 19p of epoxy resin impregnated glass fabric substantially identical with the glass fabric sheets 16. Between the impregnated glass sheets 19p is a second attenuating sheet 19a similar in construction to the first attenuating sheet 17a but differing in electrical properties so that a gradient of electrical properties can be obtained in the composite material. The insertion loss of the second attenuator sheet 19a is greater than the insertion loss of the first attenuator sheet 17a.

A layer of honeycomb core material 20 is provided inwardly of the sandwich of glass fabric sheets 19p and the second attenuator sheet 19a. The honeycomb core material 20 is substantially identical to the honeycomb core material 18. Inwardly of the honeycomb layer 20 is an attenuator layer 21 comprising glass fabric prepreg sheets 21p which are substantially identical to the initial prepreg sheets 16 and a third attenuator sheet 21a therebetween similar to the second attenuator sheet 19a but differing therefrom in electrical properties so as to have a higher insertion loss in order to provide a gradient of electrical properties through the composite. Next inwardly is provided a layer of honeycomb material 22 substantially identical with the honeycomb layer 18. Inwardly of the honeycomb layer 22 is a laminating sheet sandwich 23 comprising two glass fabric prepreg sheets 23p substantially identical to the initial prepreg sheets 16 and a fourth attenuator sheet 23a therebetween. The fourth attenuator sheet is substantially the same as the third attenuator sheet 21a but has a higher insertion loss. Inwardly of the sandwich of glass fabric sheets 23 is provided a honeycomb core material 24 which is substantially identical to the honeycomb core material 18. Next inwardly in the structural composite material are three layers of epoxy resin impregnated glass fabric sheets 25 which are substantially identical to the initial prepreg sheets 16. The innermost layer of the structure composite, that is the layer most remote from the impinging energy, is a layer of metal foil 26 such as, for example, aluminum foil. This foil can be smooth or have an embossed design for adhesive bonding to other elements of the aircraft. The foil serves as an electrical termination of the structure or short circuit.

The layers or lamina illustrated in FIG. 2 are assembled sequentially on a mold to produce a laminated sandwich part having a desired geometry. The honeycomb cores and attenuator layers are assembled in consecutive alternation, that is each pair of cores has an attenuator layer therebetween and each pair of attenuator layers has a honeycomb core therebetween. After placing the layers on the mold, the assembly, or a selected sub-assembly, is placed in a vacuum bag, the bag is evacuated and the assembly is heated to effect at least a partial cure of the polymerizable resins. The formed sections 11A and 11B comprising an assembly of laminating sheets and honeycomb are preferably fully cured before fabrication of larger parts by means of a joint as described hereinafter. The epoxy resin employed in a preferred embodiment is quite adhesive and bonds well with all of the materials employed in the fabrication of the illustrative radar attenuating material.

Such an assembly of glass fabric prepregs, selected attenuator sheets, and honeycomb core materials when bonded together forms a strong structural composite having good rigidity, temperature resistance and light weight. Additionally this composite material serves to attenuate radar energy as is more fully explained in the aforementioned copending application. It has been found, however, that a joint between contiguous sections of such a composite material has a decreased ability to attenuate radar energy unless special fabrication techniques are employed.

A preferred joining technique embodying the principles of this invention as illustrated in FIG. 1 comprises the joint structure 12 which is shown in cross-section in FIG. 3. The thickness of the laminating fabric sandwich layers of FIG. 3 and FIG. 4 has been exaggerated in the drawings for purposes of clarity of exposition. These layers are normally but a few thousandths of an inch thick. As shown in FIG. 3 the two sections 11A and 11B of laminated honeycomb sandwich of the type illustrated in FIG. 2 are abutted at a joint line 30.

The cured sections 11A and 11B are prepared to form a joint by forming or cutting so that each section has a stairstep arrangement extending along the edge of the section to be joined to the corresponding section. These stairsteps extend substantially parallel to the edge and are formed so that the distance between sections when abutted is greater on one side of the thickness of the sections than at the other. That is, a substantially V-shape partial gap is formed between abutting sections with the point of the V nearest the joint line where the sections are abutted. The stairsteps are thus progressively increasingly remote from the joint line 30, that is, each stairstep further from one surface of the composite illustrated in FIG. 3 is also set back so as to be further from the joint line 30. The stairstep arrangements on the sections 11A and 11B are each such that the riser of the step comprises mainly the honeycomb core, the thickness of the laminating sheet sandwich being considerably less than the thickness of the core; and the tread of the stairstep is the laminating sheet material. The thickness of a typical honeycomb core is about one-fourth inch and it is preferred that the tread of the stairstep or set back be about one-half inch. By providing that the tread of the stairstep be about twice as wide as the riser is high, there is provided virtually no opportunity for radar reflectance from the joint as each discontinuity in electrical properties is displaced from all other discontinuities. Additionally such an arrangement assures adequate space for manipulating the strips of material and sufficient overlap to prevent gaps due to shrinkage during curing.

Thus, for example, a typical stairstep is provided including the innermost honeycomb core 24. The base at the foot of the riser of the stairstep comprises the laminating fabric sheets 25 and the riser 31 of the stairstep comprises the edge of the honeycomb core 24. The riser also includes the thickness of the laminating fabric sandwich 23 which is thin compared with the thickness of the honeycomb core 24. The tread 32 of the stairstep comprises the fabric laminating sandwich 23.

A plurality of similar stairsteps are provided on overlying layers of honeycomb core material and laminating fabric sheets with the stairsteps being progressively increasingly remote from the joint line 30. When two sections 11A and 11B of laminated honeycomb sandwich are assembled for joining, the pieces are abutted at the joint line 30 so that the innermost layers 25 and 26 are adjoining. The arrangement with stairsteps being progressively increasingly set back on the two sections 11A and 11B forms a stairstep type of partial gap in a substantially symmetrical V-shape between the sections.

The stairsteps can be formed in the original layup of the composite, or preferably are formed by cutting after curing. Difficulty in obtaining sufficient accuracy is encountered when the stairsteps are formed before curing because of slight shrinkages that occur upon curing.

The cured sections are readily cut with a sharp knife. The preferable technique is to employ a flexible metal template laid along the joint line. A knife cut is made along the edge of the template through the laminating layers and the underlying honeycomb core. The webs of the honeycomb core are readily broken away, and the surface of the underlying laminating layer exposed. This surface can be lightly sanded to remove the small fillets of resin remaining. Alternatively the edges can be milled with conventional carbide tools to produce the stairsteps. The use of a template is advantageous as the same template can also be used to cut strips of material to be placed into the joint as hereinafter described.

To form an interconnection between the sections 11A and 11B of stairstepped laminated honeycomb sandwich, a strip of honeycomb core material 24' is inserted between the edges of the honeycomb core material 24 so as to closely abut the edges of the core material 24. The honeycomb core 24' is preferably similar to the honeycomb core 24 so that good bonding and minimum variation in electrical properties are obtained. It is also preferred that the honeycomb core strip include a cured nylon modified phenol-formaldehyde resin treated with an uncured epoxy resin. As is recited in greater detail in the aforementioned copending application, such a cured resin is rendered pliable by coating with the epoxy resin; and in order for the strip 24' to best conform to the shape of the joint, it is preferred that it be so rendered pliable.

A strip of uncured laminating sheet sandwich or attenuator layer 23' substantially identical with the laminating sheet sandwich 23 is placed over the section of honeycomb core 24' and overlapping the treads 32 of the stairsteps on the two sections 11A and 11B by at least one quarter inch to allow for shrinkage upon curing. The inserted strip of material 23' thus overlaps the sheet material 23 so as to bridge the honeycomb material. This strip 23' comprises fabric prepregs and an attenuator sheet of the same electrical characteristics as the respective materials of the sandwich 23. The inserted section of sheet material 23' is bonded to the inserted honeycomb core section 24' and to the underlapping sheet material 23 on the tread of the stairstep by the resins therein to provide a structurally strong layer and a layer with a minimized discontinuity of electrical properties. Because of the double thickness of material, the electrical characteristics are non uniform across the overlap, and some small added reflection of radar is caused thereby.

In a similar manner a strip of honeycomb core material 22', wider than the honeycomb core strip 24' is inserted between the edges of the honeycomb core material 22 and closely abutting thereagainst. This strip of honeycomb core material 22' is overlaid with a composite strip of laminating fabric material 21' substantially the same as the sandwich material 21 so as to bridge the gap betwen treads of corresponding stairsteps. The strip of overlying fabric 21' also overlaps the sandwich fabric 21 and is bonded thereto to provide a substanial continuum of structural properties and a minimized discontinuity of electrical properties. In a corresponding manner a strip of honeycomb material 20' is provided in abutting relation between the edges of honeycomb core material 20 and a layer of fabric sheet laminating material 19' is provided thereupon to bridge the gap between the treads of corresponding steps. The inserted strip of material 19' overlaps the fabric sandwich 19 to provide a substantial continuum of structural properties and a minimized discontinuity of electrical properties. In a similar manner a strip of honeycomb material 18' is provided in abutting relation between the edges of honeycomb core material 18 and is overlaid by layers of laminating fabric 17' and 16' having properties corresponding to sandwich layers 17 and 16 respectively. These overlying layers 16' and 17' overlap the outermost layers 16 and 17 of the composite material to provide a substantially smooth outer surface to the assembled composite, a substantial continuum of structural properties and a minimized discontinuity of electrical properties. In FIG. 1, the strips of material added into the joint are illustrated partially peeled back to demonstrate the way in which the materials are assembled to have mutually displaced junctions between the sections to be joined and the strips of material.

Each of the strips of honeycomb core material inserted and the sandwich laminating fabric layers employed to form the joint structure 12 is substantially identical with the corresponding materials in the laminated honeycomb sandwich sections 11A and 11B. The materials laid in to form the joint 12 include uncured resin systems corresponding to the resin systems in the cured honeycomb sections 11A and 11B. After assembling the strips of material in the joint structure the entire part or in some instances only the portion along the joint is placed in a vacuum bag that is then evacuated so as to apply atmospheric pressure to the assembled joint. While the system is evacuated the entire assembly is heated at 300°F for 6 hours in order to cure the illustrative resin systems and bond the layers together with the adhesive resin systems to form a strong and permanent structural joint between the honeycomb sections 11A and 11B. It is also contemplated that preliminary cures be made in some instances as the assembly of the joint progresses with final cure after full assembly. Thus, for example, the honeycomb core strips 24' and 22' and the laminating sandwich strips 23' and 21' are placed as described and this sub-assembly vacuum bagged and at least partially cured before the overlying strips are put into place. The preliminary cure step is added if it is contemplated that more than about four hours will be required to complete the assembly. The preliminary cure reduces the possibility of intersoluble resins forming a low viscosity mixture and flowing to disrupt the desired electrical properties.

After curing the composite the edges of the layers 16' and 17' are lightly sanded and if necessary filled with epoxy resin to form a smooth surface with no sharp irregularities. As an alternative, the outermost prepreg sheet of the final assembled part may be laid in place after smoothing of the edges. This provides a somewhat smoother surface and minimizes the thickness of the edges of fabric subject to aerodynamic erosion.

A particular assembly of materials has been described and illustrated as an examplary embodiment, however, some variation in the materials is contemplated. Thus, for example, it is contemplated that some of the prepreg sheets be omitted and that vapor barrier layers with adhesive be applied to the attenuator sheets. It is clear that adhesives can be used to attach the metal foil to the assembly after cure rather than bonding by means of the epoxy resin in the structure and that protective or decorative coatings can be applied on finished parts. A construction has also been made where the honeycomb core layers 24 are cut only to the joint line and the edges so produced are abutted. A fabric insert similar to 23' is thus the first insert in the joint and the overlying strips are correspondingly narrower.

In a like manner it is clearly contemplated that a similar construction is applicable to radar transparent honeycomb materials. Such sandwiches are commonly used as antenna housings on aircraft and it is highly desirable in such an application that the electrical properties of the antenna housing be uniform throughout. If electrical discontinuities or variations are present in the housing, the radar beam is refracted differently at the discontinuity and the accuracy of the radar equipment is degraded. The novel joint structure permits segmented constructions of antenna housings with joints having a minimum of change in electrical characteristics so that optimum transmission is obtained. This segmented construction has been virtually impossible previously as the joining techniques available require metal inserts or have introduced other foreign matter in the joint, a disadvantage clearly obviated by the described joint. The illustrated joint structure has a slight amount of added material at the overlaps, leading to electrical discontinuities. These discontinuities are arranged so that they extend but a small portion of the way through the structure and are displaced from each other to minimize variations in reaction to radar.

As assembly has been described and illustrated in FIG. 3 wherein sections of laminated honeycomb structure were fabricated with a joint between abutting sections prepared by inserting strips of laminating material. This joint was fabricated from the inside portion of the laminated honeycomb sandwich to the outside portion thereof. It will be readily apparent that a similar joint between abutting sections can be prepared by assembly from the outside portion of the sandwich sections to the inside portion thereof. A somewhat similar construction is illustrated in FIG. 4 as applied to the repair of a damaged laminated honeycomb structure.

It sometimes occurs in the handling and use of laminated honeycomb structures that a perforation of a structure or other damage is inflicted. It has previously been necessary to scrap such pieces of damaged material as satisfactory repair procedures have not been available. It has been found that repair of damaged structures can be accomplished by employing the principles of this invention. Thus if damage occurs to a laminated honeycomb structure the damaged material is removed, preferably with a sharp knife, and a terraced depression is prepared in the material around the region so damaged. Such a prepared depression 34 is illustrated in FIG. 1. As in the previously described embodiment of this invention a plurality of stairsteps are formed around the damaged area with the stairsteps progressively increasingly set back from the central portion of the damaged area. These stairsteps have a laminating layer as the tread 132 and include a honeycomb core as the riser 131. Such a portion after repair is illustrated in cross section in FIG. 4.

As illustrated therein a depression substantially V-shape in cross-section is prepared and sections of repair material inserted therein which substantially reconstruct the removed material. A section of attenuator layer or laminating sheet sandwich 117' is inserted on the narrowest level of the depression. This material bridges any gap in the attenuator layer 17 and overlaps said layer. The laminating sandwich 117' is substantially identical to the laminating sheet sandwich 17. A section of honeycomb core material 118' is inserted within the depression so as to abut against the honeycomb core material 18. The honeycomb core section 118' comprises uncured resins which are substantially similar to the resins in the cured honeycomb material 18. In a similar manner sections of attenuator layers 119', 121' and 123' are inserted into the depression so as to overlap the respective attenuator layers 19, 21 and 23. Likewise sections of honeycomb core material 120', 122' and 124' are inserted into the depression so as to abut against the honeycomb core materials 20, 22 and 24. Finally a layer of laminating sheet material 125' is laid over the final honeycomb core section 124' and overlapping the laminating sheet material layer 25. A sheet 126' of metal foil is bonded to the final laminating layer 125'.

After forming the repair section as described the entire region or possibly the entire part is placed in a vacuum bag which is then evacuated and the resin systems in the repair materials cured by heating as described above. In repairing such a structure it may be desirable to assemble a skin portion 16 previous to repair of the section. This is preferred if the damaged area extends completely through the honeycomb structure. Such a skin material is constructed so that no joint line exists adjacent the repaired section. This is advantageous in preparing a completely smooth and uniformly strong external surface on the repaired part. As illustrated in FIG. 1 it is preferred that the cutout area around the damaged portion be in a substantially rectangular pattern or that a cutting template be employed so that sections of honeycomb core material and laminating sheet material can be readily cut to fit. After cutting the material it is desirable to lightly sand the surfaces so that good adhesion is obtained between the uncured resins in the repair materials and the already cured resins in the part to be repaired. By employing such a repair technique having a plurality of stairsteps it has been possible to reclaim expensive damaged portions which would otherwise have required scrapping.

It has also been found highly useful in repair of damaged parts to employ a resin system that cures at room temperature, thereby eliminating the requirement for large heating chambers. A typical system is a conventional epoxy resin cured with an aliphatic amine. Such a resin system cures at room temperature and has good adhesion to the resins employed in the preferred embodiment. To effect such a construction, honeycomb core sections having a nylon modified phenolformaldehyde resin treated with an epoxy resin are employed as described. This resin system will cure to the point of rigidity in a day at room temperature and will continue to cure for a short time thereafter. Epoxy resin activated with an aliphatic amine is impregnated into a glass fabric and promptly employed just as the described prepregs. Such a system is substantially cured in one day. It is preferred when using such a system that a vacuum bag technique be employed to ensure good contact between the various materials employed until the parts are rigid. Repair portions prepared in this manner are electrically and structurally similar to the original laminated material.

Obviously many modifications and variations of the present invention are possible in light of the above teachings. It is therefore to be understood that within the scope of the appended claims the invention may be practiced otherwise than as specifically described.

What is claimed is:

1. A structural joint for a laminar composite radar attenuating structure comprising:

first and second sections of laminar composite structure in edge abutment and having successive attenuating layers of preselected electrical characteristics collectively providing the composite structure with a substantial attenuation of electromagnetic radiation impinging thereon, said successive attenuating layers terminating at progressively increasing distances from the edge abutment to form a substantially V-shape stairstep partial gap between said first and second sections;

a connecting section between said first and second sections comprising strips of material bridging the edge abutment so that junctions between layers of said strips of bridging material and corresponding successive attenuating layers of said first and second sections are mutually displaced to minimize magnitude of variations in attenuation of electromagnetic radiation, and wherein each of said strips is composed of substantially similar material as the corresponding successive layers of said first and second sections; and a curable adhesive resin for bonding said strips to said successive layers.

2. In a laminated radar attenuating structure having to substantial attenuation and minimal reflection of electromagnetic radiation, a joint connecting two adjacent portions of the structure comprising a plurality of connecting lamina each joined with corresponding lamina on either side of the joint to provide electrical discontinuities on either side of the joint, at least part of said lamina having selected electrical properties and providing a combination of lamina for attenuating radar energy impinging thereon, each said electrical discontinuity having an extent in a direction normal to a surface of the structure considerably less than the total thickness of the structure, said electrical discontinuities being displaced from each other in a direction parallel with said surface to minimize variations in attenuation of electromagnetic radiation in the combination of lamina.

3. A spliced multi-layer radar attenuating structure wherein at least some of the layers are attenuating layers having predetermined electrical properties that provide substantial attenuation and minimal reflection of radar incident on the structure comprising first and second structure portions and a connecting portion therebetween, said connecting portion comprising a multi-layer connecting structure having attenuating layers corresponding to and of like electrical properties to corresponding attenuating layers of said first and second structure portions, each attenuating layer of said connecting portion being in contact with corresponding attenuating layers of said first and second structure portions forming electrical discontinuities at such contacts, each of said electrical discontinuities being displaced from all other electrical discontinuities along the direction of extent of said attenuating layers whereby radar reflection from said discontinuities is minimized.

4. A structural joint for a honeycomb sandwich structure comprising:

first and second sections of honeycomb sandwich structure, each said section comprising a plurality of sheets in consecutive alternation with a plurality of honeycomb cores, each of said sections having a plurality of stairsteps on an edge thereof, the tread of each of said stairsteps being a sheet and the riser of each of said stairsteps including a honeycomb core;

a plurality of honeycomb core sections closely fitted between the risers of corresponding stairsteps of abutting sections; and a plurality of sheet sections bridging said honeycomb core sections, overlapping a portion of the treads of corresponding stairsteps, and bonded thereto.

5. A method of joining edges of two honeycomb sandwich sections comprising:

forming a plurality of stairsteps on each of said honeycomb sections, the tread of each of said stairsteps including a sheet of laminating material and the riser of each of said stairsteps including a honeycomb core;

abutting a portion of said honeycomb sandwich sections to form opposing pairs of stairsteps on said sections;

fitting a honeycomb core section between the risers of each of said stairstep pairs;

placing a plurality of sheet sections bridging each of said honeycomb core sections and overlapping a portion of the treads of corresponding stairsteps; and bonding said sheet sections to said honeycomb core sections and the stairstep treads.

6. A method of joining edges of two honeycomb sandwich sections wherein said sandwich sections comprise a plurality of honeycomb cores in consecutive alternation with resin impregnated fabric sheets comprising:

forming a stairstep pattern on each of said honeycomb sandwich sections wherein the riser of each of said stairsteps is a honeycomb core and the tread of each of said stairsteps is a fabric sheet, said stairsteps being progressively increasingly remote from the edge of the honeycomb sandwich sections;

abutting a portion of said honeycomb sandwich sections to form a partial stairstep gap therebetween;

placing a section of honeycomb core material between each pair of corresponding stairstep risers;

placing a resin impregnated sheet section over each said honeycomb section and at least partially overlapping the treads on said stairsteps;

pressing said resin impregnated fabric sections and said honeycomb core sections against said stairsteps; and curing the resins.

7. A method of repairing a damaged article having a plurality of cured honeycomb cores bonded in consecutive alternation with cured resin impregnated fabric sheets of which at least some have predetermined values of impedance comprising:

cutting a plurality of stairsteps on the article around the damged area so as to remove damaged material therefrom, said stairsteps forming a terraced depression in said article, the risers on each of said stairsteps including a honeycomb core thickness and the treads on each of said stairsteps including a sheet surface;

fitting sections of honeycomb core material of progressively increasing size between risers of each of said stairsteps;

placing resin impregnated fabric sheet sections having impedance values of corresponding ones of said fabric sheets over said honeycomb sections and at least partially overlapping the treads on said stairsteps; and bonding the honeycomb core and the fabric sheet sections together and to said article.

8. A joint uniting abutting sections of radar attenuating structure wherein said sections each comprise a plurality of honeycomb core layers in consecutive alternation with a plurality of attenuator layers comprising:

a plurality of stairsteps on abutting edges of each of said sections, the riser of each of said stairsteps including a honeycomb core and the tread of each of said stairsteps including an attenuator layer;

a plurality of honeycomb core strips closely fitted between risers of corresponding stairsteps of abutting sections, said honeycomb core strips being substantially similar to the respectively corresponding honeycomb cores in the radar attenuating structure sections;

a plurality of attenuator layer strips, each said attenuator layer strip overlying a honeycomb core strip and overlapping a tread on a stairstep, said attenuator layer strips being substantially similar to the attenuator layer overlapped thereby, said attenuator layer strips being bonded to said honeycomb strips and said abutting sections.

9. A joint as defined in claim 8 wherein each of said attenuator layer strips comprise:

a pair of glass fabric sheets impregnated with an epoxy resin; and an attenuator sheet therebetween, said attenuator sheet comprising a fabric sheet coated with an elastomer containing a suspension of conductive carbon therein.

10. A joint as defined in claim 9 wherein said honeycomb core material comprises a glass fabric impregnated with a nylon-modified phenol-formaldehyde resin and coated with an epoxy resin having a suspension of conductive carbon therein.

11. A method for structurally connecting regions of radar attenuating structure wherein said regions each comprise a plurality of honeycomb core layers in consecutive alternation with a plurality of attenuator layers comprising:

shaping a plurality of stairsteps on adjoining regions of said structure so that the tread on each of said stairsteps includes an attenuating layer and the riser on each of said stairsteps includes a honeycomb core, said stairsteps being progressively increasingly set back to form a substantially V-shape partial gap between said adjoining regions;

fitting honeycomb core sections of progressively increasing size between risers of successive stairsteps, said honeycomb core sections being substantially similar to the honeycomb core layers of the radar attenuating structure;

placing attenuator layer sections over said honeycomb core sections and at least partially overlapping the treads of said stairsteps, each said attenuator layer section being substantially similar to the attenuator layer included in the stairstep tread overlapped; and bonding said attenuator layer sections to said honeycomb core sections and to said adjoining regions of radar attenuating structure to form a unitary body.

* * * * *